May 29, 1956 E. S. McCALLISTER ET AL 2,748,202
AMPLIFIER WITH INTERFERENCE REDUCING CIRCUIT
Filed Jan. 13, 1953
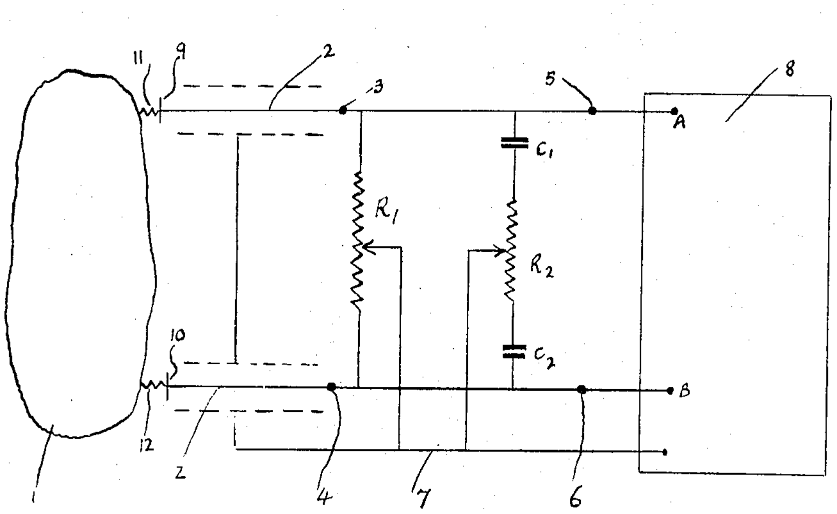
INVENTORS
EDWARD SAMUEL Mc.CALLISTER
KAZIMIERZ WLADYSLAW WOZNICA
BY Fred M. Vogel
AGENT

United States Patent Office

2,748,202

Patented May 29, 1956

2,748,202

AMPLIFIER WITH INTERFERENCE REDUCING CIRCUIT

Edward Samuel McCallister, Chiswick, London, and Kazimierz Wladyslaw Woznica, Putney, London, England, assignors to Hartford National Bank and Trust Company, Hartford, Conn., as trustee

Application January 13, 1953, Serial No. 331,066

Claims priority, application Great Britain January 25, 1952

2 Claims. (Cl. 179—171)

The present invention concerns an interference reducing circuit. More particularly, it concerns an electric circuit arrangement, for example for use in electro-biological apparatus for the reduction of unwanted signals due to stray electric and/or magnetic fields, which circuit arrangement is provided with a pair of input terminals. These input terminals are supplied with a desired signal in a differential manner with respect to some arbitrary voltage level, for example ground, which arbitrary voltage level will hereinafter be called ground, for the sake of simplicity. The said circuit may be connected via a pair of output terminals to an indicator, which may comprise a differential amplifier. Very often, however, it is found that unwanted signals due to the electric and/or magnetic fields created by alternating voltage supply lines are induced in the desired signal source by virtue of its being in the said field or fields and these unwanted signals appear at the input terminals of the above mentioned electric circuit arrangement. Fortunately these unwanted voltages usually produce approximately equal, as opposed to differential, effects at the input terminals with respect to ground, so that since the normal operation of the circuit arrangement is to favor signals applied differentially at the input terminals, and therefore to discriminate against signals which have approximately equal effects at these terminals, these unwanted signals have a reduced effect at the indicator. Naturally if the unwanted signals at the input terminals were to be exactly equal, there would be no resultant effect at all on the indicator since there would be complete cancellation. In practice, however, the unwanted signals at the two input terminals are rarely exactly equal and their values are, more often than not, much greater than the desired signal, so that the result of only partial cancellation may still be so large as to prevent accurate indications of the desired signal.

The desired signal source will have a definite internal impedance which, in view of the differential connection of the system, appears as two separated impedances each in series with an input terminal. These two source impedances may not be equal.

It has been found that a better approximation to cancellation of the unwanted signal effects may be achieved by connecting a first resistance across the input terminals and having a sliding contact on this resistance which is connected to ground. By moving the sliding contact, an adjustment may be made to obtain a great improvement in the measure of cancellation.

The operation of the device just described is such, however, that cancellation is only possible if the unwanted signals at the input terminals have the same phase, since the major effect of the movement of the sliding contact is to vary the amplitudes of the unwanted signals.

The question of phase arises because of the presence of capacitances in the circuit. Consequently the unwanted signals may not have the same phase if the capacitances are not properly balanced or if, as mentioned above, the two source impedances are not equal.

According to the present invention an electric circuit arrangement for the reduction of unwanted signals due to stray electric and/or magnetic fields, comprises a pair of input terminals and a pair of output terminals, which input terminals are to be supplied differentially, with respect to ground, with a desired signal, wherein means are provided to enable the unwanted signal at each output terminal to be made, with respect to ground, substantially equal in phase.

If the unwanted signals at the input terminals are not in phase, it has been found that after the sliding contact of the first resistance has been adjusted to secure a minimum effect at the indicator due to unwanted signals, a further improvement in cancellation may be obtained by adjusting the phase of the unwanted signals at one input terminal with respect to the unwanted signals at the other input terminal. When the phase difference is small, as is usually the case, this phase adjustment may be obtained conveniently by having a second resistance with a sliding contact, said sliding contact being connected to ground and the ends of the second resistance each being connected through a capacitor to a respective input terminal. The capacitors preferably have equal capacities and may together have, for example, a total reactance at the frequency of the unwanted signals which is substantially equal to the resistance value of the second resistance. Adjustment of the sliding contact of the second resistance effects a phase balance, after which trimming of the sliding contact adjustment of the first resistance may be required to restore amplitude balance whereby substantial cancellation of unwanted signals may be effected at the indicator.

A circuit arrangement in accordance with the present invention is of particular value when applied to a thermionic amplifier having a pair of input terminals fed differentially from a desired signal source. Such a differential amplifier may be widely used for biological purposes, such as producing electro-cardiograms.

Assuming the capacitance of each output terminal with respect to ground to be equal, one to the other an alternative means of making the phase of the unwanted signals the same is by overcoming the effect of the inequality of the two source impedances by artificially increasing the apparent value of one or both of these impedances by the addition of an external resistance or resistances so that said apparent values are substantially equal.

One method of doing this is to make the apparent value of both of the source impedances so large (e. g. 0.5 megohm) that any variation in the value of the actual source impedance is negligible relative to the apparent value. An alternative method would be to make one or both of the additional resistances adjustable.

In order that the invention may be more readily carried into effect an embodiment used in conjunction with an electro-cardiograph will now be described with reference to the accompanying drawing wherein:

The figure is a schematic diagram of a preferred embodiment of the circuit arrangement of the present invention.

In the figure, a body 1 having source impedances 11 and 12 is connected via electrodes 9 and 10 and screened leads 2, 2 to the input terminals 3, 4 of the coupling network of the present invention. Output terminals 5, 6 are connected to terminals A, B respectively of an electro-cardiograph which is represented by a differential amplifier and indicator 8. Between the input terminals 3 and 4 is connected a resistor or potentiometer $R_1$ provided with a sliding contact connected to the ground line 7. Connected in parallel with the resistor $R_1$ is a series combination of a capacitor $C_1$, a resistor or potentiometer $R_2$ and a capacitor $C_2$, of which the resistor $R_2$ is provided with a sliding contact connected to the ground line 7. In this case the desired signal is obtained from electrodes 9 and 10 attached to points of a body 1. The unwanted signals in this instance may be produced between the body 1 and the ground line 7 of the amplifier and thereby unwanted signals may be transferred to the input terminals of the differential amplifier 8. The use of screened connecting leads, however, inevitably introduces electrical capacitance which in conjunction with source impedances, in known manner, may result in a difference of phase of the unwanted signal at one input terminal with respect to the unwanted signal at the other input terminal. Other capacities present in the system may produce a similar effect.

The circuit arrangement is adjusted by varying the position of the sliding contact on the resistor $R_1$ until a minimum unwanted signal is obtained. Then the sliding contact on the resistor $R_2$ is adjusted for a further minimum. It may be necessary to repeat these steps several times before the best reduction of the unwanted signal is obtained.

An example of one set of suitable values which may be used for the reduction of unwanted signals having a frequency of 50 cycles per second is as follows:

$R_1$=100 kilohms
$R_2$=100 kilohms
$C_1$=0.1 microfarad
$C_2$=0.1 microfarad

A circuit arrangement in accordance with the present invention is of very considerable value when used with differential amplifiers constructed using the "long-tailed pair" technique, in which the two input valves of the amplifier have a common cathode resistance. Such an arrangement in itself discriminates very well against unwanted signals with respect to desired signals applied differentially, but this is only fully operative if the unwanted signals at the two input terminals are equal in amplitude and phase. The present invention offers the means whereby such equality may be obtained.

In differential amplifiers using a number of stages in cascade, the circuit arrangement of the present invention may be applied between any of the stages so as to equalize any phase differences that may occur in the unwanted signals that exist there.

It is to be understood that the invention is not limited to the details disclosed but includes all such variations and modifications as fall within the spirit of the invention and the scope of the appended claims.

What we claim is:

1. In a system including a signal source and an amplifier for said signal, a network for coupling said source to said amplifier and for reducing unwanted signals arising from stray fields, said network including a pair of input terminals for connection to said source to be supplied differentially with the desired signal with respect to ground; a pair of output terminals for connection to said amplifier to supply said signals differentially thereto relative to ground; and means to cause the unwanted signal at each output terminal to have equal amplitudes and phases relative to ground, said means including a first potentiometer connected across said input terminals and having a sliding contact connected to ground, a pair of capacitors, and a second potentiometer each end of which is connected through a respective capacitor to a respective input terminal, said second potentiometer having a sliding contact connected to ground.

2. A circuit arrangement as claimed in claim 1 wherein said first and second capacitors have substantially equal capacitances and the total reactance of the said capacitors in series, at the frequency of an unwanted signal, is substantially equal numerically to the resistance of said second potentiometer.

References Cited in the file of this patent

UNITED STATES PATENTS

| | | |
|---|---|---|
| 2,032,253 | Bush | Feb. 25, 1936 |
| 2,135,037 | Landon | Nov. 1, 1938 |